March 19, 1929.  W. NOBLE  1,705,492
ENGINE MOUNT
Filed Aug. 15, 1927  2 Sheets-Sheet 1
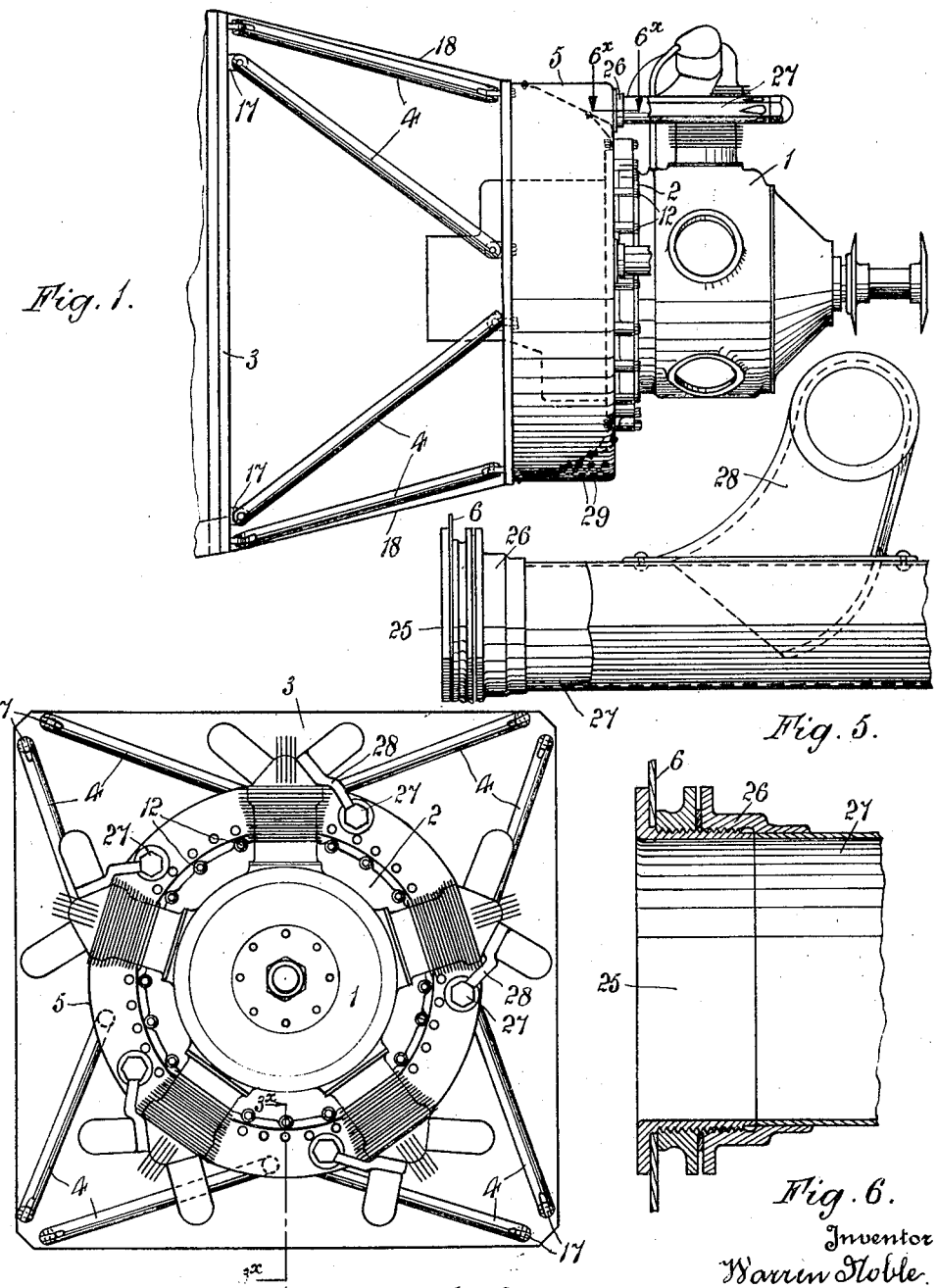
Inventor
Warren Noble.
By
Attorneys

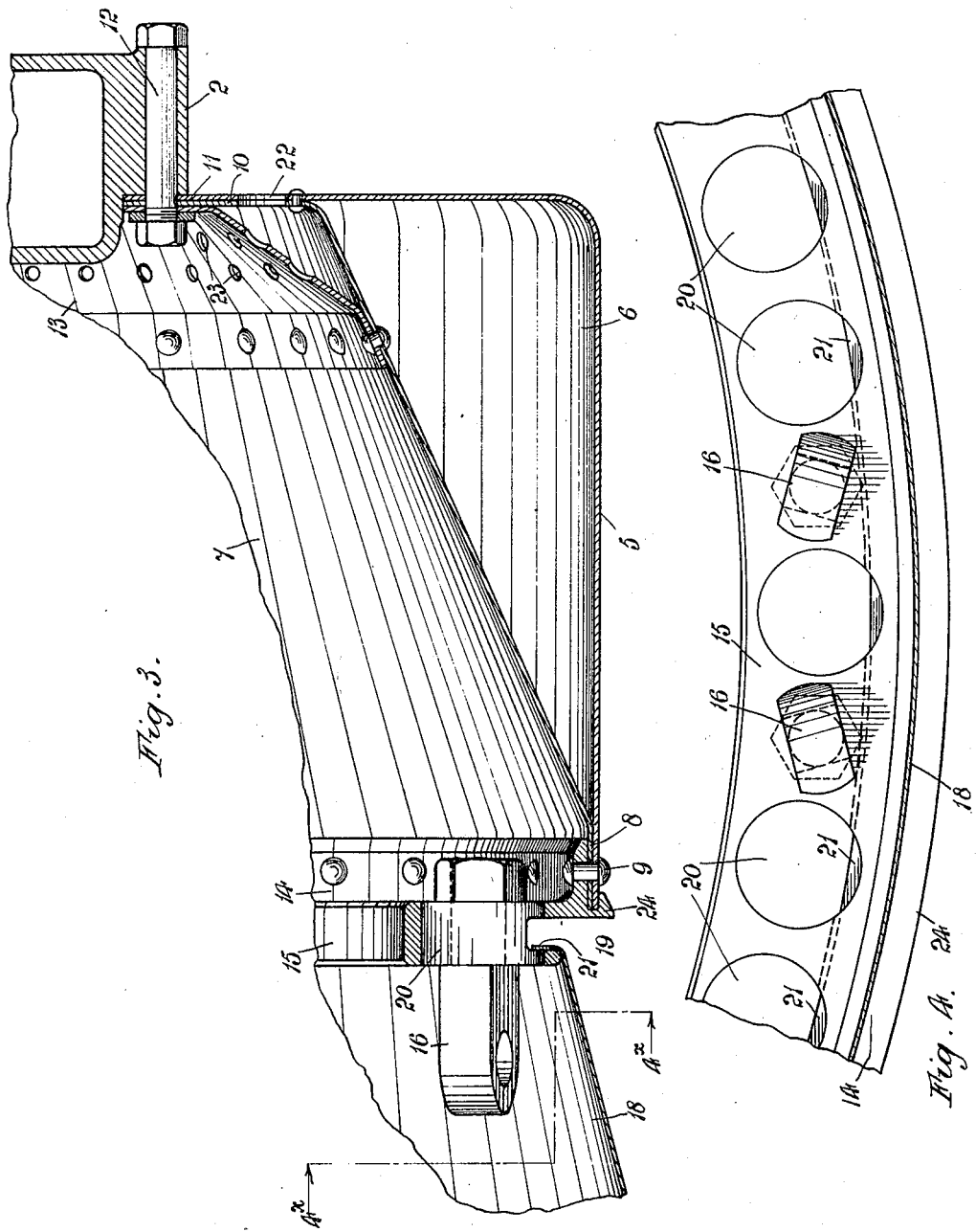

Patented Mar. 19, 1929.

1,705,492

UNITED STATES PATENT OFFICE.

WARREN NOBLE, OF DETROIT, MICHIGAN.

ENGINE MOUNT.

Application filed August 15, 1927. Serial No. 213,049.

This invention relates to the mounting of engines, and more particularly the mounting of fixed radial engines on aircraft or structures wherein it is desired that the engine be supported in advance of a bulkhead or fixed member, the principle of the invention being to provide a novel type of mount adapted to operate as a muffler or exhaust manifold for an engine mounted thereon and to afford a simple, rigid construction for the support of the engine, lending itself to ready attachment and detachment of the engine.

The invention also has for its object to provide an annular manifold having inner and outer walls forming a rigid structure adapted to support an engine axially thereof and to be supported in advance of a fixed support or bulkhead; and also contemplates the provision of exhaust stacks or pipes extending forwardly in circular series from the front of the said annular manifold to receive exhaust of the cylinders mounted on the said manifold. The invention further contemplates the provision for self-adjustment or flexibility between the exhaust pipes and the manifold to provide for variation or expansion or contraction and to facilitate assembling.

A further object of the invention is to provide for the cooling of the inner wall of the manifold and the ventilation of the space surrounded by the said manifold.

Still further objects or advantages subsidiary or incidental to the aforesaid objects, or resulting from the construction or operation of the invention as it may be carried into effect, will become apparent as the said invention is hereinafter further disclosed.

In carrying the said invention into effect, I may provide, for attachment to the mounting ring or flange of a fixed radial engine, an annular exhaust manifold having inner and outer walls enclosing the exhaust chamber of the said manifold and terminating at the front of the manifold, an inwardly extending flange adapted to be secured to the mounting ring or flange of the engine, as by bolting, the rearward portion of the said walls carrying a rigid mounting ring by which the said manifold may be connected by struts to a fixed structure, such as the fire bulkhead of an aeroplane, the inner and outer walls of the said annular exhaust manifold forming a rigid support for the forward flange thereof from the rearward ring.

The face of the annular manifold is provided with couplings opening thereinto in circular series and slidably receiving exhaust pipes adapted for connection with the exhaust ports of the engine cylinders. The forward flange of the exhaust manifold has orifices therein for the admission of air to the space circumscribed by the manifold and means are provided at the rear of the manifold for ensuring a flow of air therefrom to orifices in the said ring whereby a current of cooling air is directed over the said inner wall.

All of which is more particularly described and ascertained hereinafter, by way of example, having reference to the accompanying drawings, wherein:

Figure 1 is a side elevation of an engine mounting embodying the said invention;

Figure 2 is a front elevation of the same;

Figure 3 is a fragmentary detail sectional view taken on the line 3ˣ—3ˣ of Figure 2;

Figure 4 is a detail sectional view taken on the line 4ˣ—4ˣ of Figure 3;

Figure 5 is a fragmentary plan of one of the exhaust pipes and its connection; and Figure 6 is a detail sectional view of the exhaust pipe coupling connecting the exhause pipe to the manifold.

The invention is illustrated in its application to a five cylinder fixed radial engine 1 having a mounting flange 2 provided at the rear end of the crankcase thereof, the engine being supported from the bulkhead 3, such as of an aeroplane, by means of struts or rods 4 extending to an annular exhaust manifold generally numbered 5. Actually the engine is mounted on the manifold and the manifold is in turn supported in spaced relation to the bulkhead 3, but the manner of securing the exhaust manifold in relation to the bulkhead is merely incidental and secondary, the principal feature of the invention lying in the utilization of an exhaust manifold as an engine mount.

It will be obvious that the means of supporting the manifold will depend upon the nature of the structure with which it is used, so that, while it lends itself admirably to the mounting of an engine in an aeroplane, it is not limited to such application.

The annular manifold 5 is shown as comprising an outer wall 6 of angular section forming the peripheral and front walls of the manifold and an inner wall 7 of frusto-conical form having a flange 8 secured to the rearward margin of the wall 6 by rivets 9, the forward end of the said wall 7 being provided with a flange 10 abutting the inner face of the front portion of the outer wall 6, as best illustrated in Figure 3, so that this flange 10 and that part of the outer wall which it abuts form an engine-mounting flange, generally numbered 11, at the front end of the manifold. The ring 11 is provided with suitable orifices whereby it may be attached to the mounting flange 2 of the engine by means of bolts 12.

13 is a re-inforcing ring or cone, the rear end of which is secured to the wall 7 and the forward end to the flange 10 thereof, thereby supporting the flange 11 against distortion and assisting in the general rigidity of the manifold.

Within the rear end of the manifold is secured by the rivets 9 a stiffening ring 14 which is formed within an inwardly turned flange 15 which in turn is provided with eyebolts 16 from which the rods 4 hereinbefore mentioned are extended to suitably located eyebolts 17 in the bulkhead 3. The relative lengths of these rods determines the axial relation of the manifold and engine to the bulkhead. Any suitable cowling such as 18 may be extended about the said rods, from the ring 14 to the blukhead, as may be considered necessary or desirable.

The said ring 14 is shown as having an annular recess 19 in its outer face and orifices 20 through the flange 15 thereof, the said orifices and the said recess encroaching upon one another whereby communication is established therebetween, and the forward end of the cowling 18 is shown as being provided with a flange 21 entering the said recess 19 and also projecting into the orifices 20 to some extent to partially interrupt air passing rearwardly through the said orifices 20.

The mounting ring 11 of the manifold is perforated as at 22 and the re-inforcing cone is also perforated at 23 so that air may enter the space surrounded by the manifold; and to induce flow of such air through the orifices 20, and the flange 15 of the ring 14, and outwardly through the recess 19 of the said ring, an annular projection or rib 24 is provided on the said ring of greater diameter than the rear end of the manifold to which the said ring is attached. This rib 24 is intended to interrupt the flow of air over the outside of the manifold and form a partial vacuum about the recess 19, which vacuum induces an outward flow of air from the recess as required. The flow is accentuated by the interrupting flange 21 of the cowling.

It will be understood that the flow of air about the outside of the manifold may be the result of forward movement of the manifold through the air or of a propeller (not shown) operated by the engine, or by both of these factors, and that the induced flow of air through the space surrounded by the manifold is directed over the inner wall 7 of the manifold and has a cooling effect thereon.

The face of the manifold has a series of openings therein, in this case five, into which are fitted nipples 25 threaded to receive nuts 26 slidably mounted upon the ends of exhaust pipes 27. These exhaust pipes are connected with the cylinders of the engine in any suitable manner as by means of branches or elbows 28 leading from the exhaust ports (not shown) of the engine cylinders.

In mounting the engine on the manifold 5, the exhaust pipes 27 are brought into alignment with the nipples 25 and the nuts 26 threaded onto the said nipples thereby holding the said exhaust pipes in such alignment and permitting any slight self-adjustment of the exhaust pipes in the said nuts which may be necessary during the assembling of the engine on the manifold, or which may result from expansion or contraction of the engine or the manifold during or following engine operation. 29 are discharge orifices in the outer wall of the manifold.

The described invention solves the problem of manifolding radial engines in a simple and effective manner, at the same time providing a light and rigid mounting therefor, and is eminently adapted to the utilization of the form of exhaust pipe described in my co-pending application, Serial Number 213,050, filed the 15th day of August, 1927.

This invention may be developed within the scope of the following claims without departing from the essential features of the said invention, and it is desired that the specification and drawings be read as being merely illustrative and not in a limiting sense, except as necessitated by the prior art.

What I claim is:—

1. In combination with fixed support and a radial engine having a mounting ring, an annular exhaust manifold attached to said fixed support and to the mounting ring of said engine whereby said engine is supported from said manifold.

2. In an engine mounting, a fixed support, an exhaust manifold carried by said fixed support, means on said manifold for the attachment thereto of an engine, said manifold being adapted for connection thereto of exhaust pipes of the engine.

3. In a mount for a fixed radial engine, supporting means for receiving the engine, comprising an annular manifold provided with a mounting flange to receive the engine, said manifold having a circular series of openings therein to receive exhaust discharged from said engine.

4. In combination with a fixed radial engine, a mount including supporting means receiving the engine in the form of an annular manifold, a circular series of couplings on said manifold, and a corresponding series of exhaust pipes extending from said engine to said couplings.

5. In combination with a fixed radial engine, a mount including supporting means receiving the engine in the form of an annular manifold, a circular series of couplings on said manifold, and a corresponding series of exhaust pipes extending from said engine slidably into said couplings.

6. As an engine mount, an annular exhaust manifold having a forwardly disposed mounting flange, said flange being perforated for the admission of air to the space surrounded by said manifold and with a rearwardly disposed air outlet permitting escape of air adjacent the inner wall of said manifold.

7. An engine mount according to claim 6, including means adjacent said air outlet adapted to interrupt flow of air about said manifold and provide a vacuum at said outlet to induce outward flow of air therethrough from the space surrounded by said manifold.

8. As an engine mount, an annular exhaust manifold having a forwardly disposed engine mounting flange, and rearwardly disposed means for the attachment of said manifold to a fixed support.

9. As an engine mount, an exhaust manifold comprising inner and outer annular walls, a forwardly disposed engine-mounting ring rigidly supported by said inner and outer walls, a rearwardly disposed reinforcing ring secured to said manifold, and means for securing the latter ring in spaced relation to a fixed support.

10. In combination, a fixed support, stays extending forwardly thereof, an annular exhaust manifold carried by the forward ends of said stays, and an engine mounted on said manifold.

In testimony whereof I affix my signature.

WARREN NOBLE.